No. 803,862. PATENTED NOV. 7, 1905.
F. STREICH.
DOUGH SHAPING MACHINE.
APPLICATION FILED JAN. 12, 1905.

Witnesses
J. W. Angell
M. A. Milord

Inventor
Frank Streich
by Frederick Benjamin Atty

UNITED STATES PATENT OFFICE.

FRANK STREICH, OF CHICAGO, ILLINOIS, ASSIGNOR TO PHIL F. CARROLL, OF JOLIET, ILLINOIS.

DOUGH-SHAPING MACHINE.

No. 803,862.    Specification of Letters Patent.    Patented Nov. 7, 1905.

Application filed January 12, 1905. Serial No. 240,714.

*To all whom it may concern:*

Be it known that I, FRANK STREICH, a citizen of the United States, residing at Chicago, in the county of Cook and State of Illinois, have invented certain new and useful Improvements in Dough-Shaping Machines, of which the following is a specification.

This invention relates to improvements in machines for manipulating dough in the formation of loaves; and the especial object of the improvements is to produce a machine of this class which will first mold the dough into a more or less symmetrical form and then stretch the skin or surface, so that it will present a smooth appearance.

Having the aforegoing and other objects of general utility in view, I have produced a machine the principles of which are illustrated in the accompanying drawings, in which—

Figure 1:
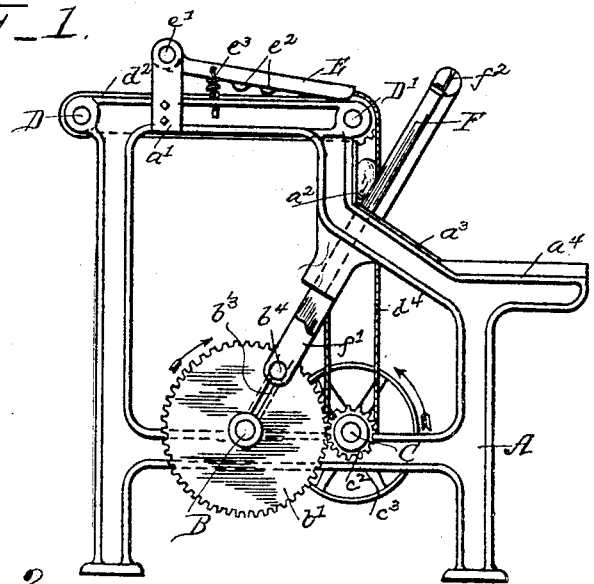
Figure 2:
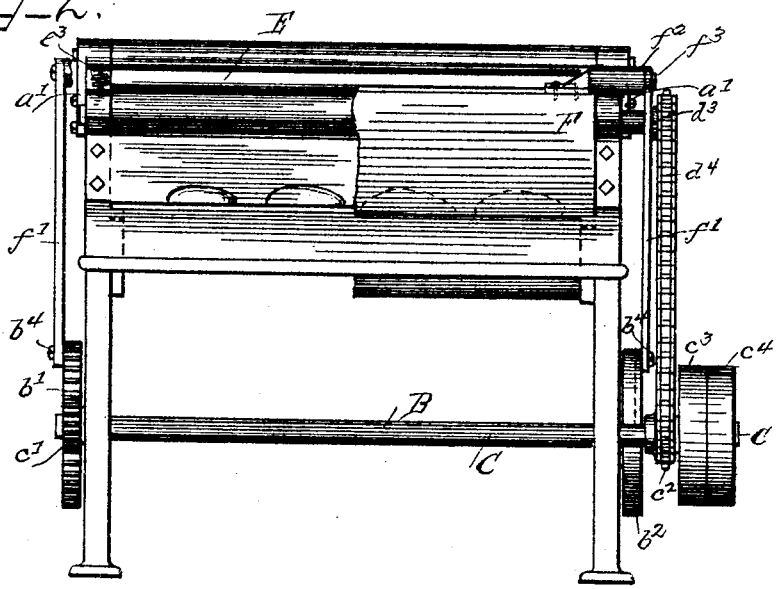

Figure 1 is a side elevation of my improved machine, and Fig. 2 is a front elevation with a portion broken away.

Referring to the drawings in detail, A represents the supporting-frame of my machine, which may be of any suitable size or shape. In the lower part of the frame is journaled a shaft B, on one end of which is fixed a gear-wheel $b'$, which meshes with a pinion $c'$, fixed on the shaft C, which is also journaled on the frame. On the opposite end of the shaft B is fixed a disk $b^2$. In the outer face of the wheel $b'$ is cut a radial groove $b^3$, and it will be understood a similar groove is cut in the outer face of the disk $b^2$, as indicated by dotted lines. In each of said grooves a pin $b^4$ is slidably mounted.

Near the right-hand end, as shown in the drawings, of the shaft C is fixed a sprocket-pinion $c^2$, and adjacent thereto on the same shaft are mounted tight and loose pulleys $c^3$ $c^4$, respectively, which may be belted to any suitable driving means.

At the top of the frame are journaled two shafts D D', which have rollers mounted thereon, and over said rollers is stretched an endless apron $d^2$. The shaft D' carries a sprocket-pinion $d^3$ at one end, which is driven by a sprocket-chain $d^4$, which in turn is driven by the sprocket-pinion $c^2$ on the shaft C.

Uprights $a'$ are bolted to the top of the frame on each side of the apron $d^2$ and in their upper ends are journaled the spindles $e'$ of the pressure-board E, which extends forwardly over the apron and with its free end in close proximity to or resting on the apron. Ribs $e^2$ extend transversely of the under side of the pressure-board and serve to check the movement of the lumps of dough as the latter are carried along by the endless apron. The pressure of the board on the dough is controlled by springs $e^3$, which are secured to the board and the frame, respectively, and may have any suitable means for adjusting their tension, if desired.

Secured to the front of the frame is a molding-board formed with a vertical portion $a^2$, a slanting portion $a^3$, and a horizontal portion $a^4$. The part $a^3$ is cut away to receive the stretching-board F, which is slidably mounted in such opening. Brackets $f^2$ are secured to the upper corners of the board F, from which extend pins $f^3$, on which are mounted the upper ends of the pitman-rods $f'$, the lower ends of which are mounted on the pins $b^4$, thus imparting a reciprocating movement to the board F. The height and the stroke of the board F are such that when in its lowermost position its upper edge will be below the surface of the inclined board $a^3$, so that lumps of dough operated on by said board F will fall by gravity down the inclined surface of the board $a^3$ onto the horizontal table portion $a^4$.

It will be observed that the relative arrangement of the board F and part $a^2$ is such that an acute-angled or V-shaped trough is formed which is adapted to receive the lumps of dough as they fall from the endless belt $d^2$. As the board F moves downwardly the lumps of dough will first be drawn to the bottom of the trough, will then be pressed into wedge shape in cross-section, and as the downward movement continues the skin or outer surface of the dough will be stretched about a horizontal axis, thus giving the lump the smooth appearance so desirable.

In Fig. 1 I have shown a lump of dough in end view as it appears at the beginning of the stroke of the board, and in Fig. 2 the lump is shown in elevation as it appears when the operation is completed. It will be understood that when the lumps leave the pressure-board they will have an approximately oval or elliptical form, which facilitates the subsequent operation by the board F.

It will be apparent that various means may be used for operating the board F without modifying the essential features of my invention.

Having thus described my invention, what I claim as new, and desire to secure by Letters Patent, is—

1. In a dough-manipulating machine, a dough-conveyer, pressure means arranged above the conveyer and adapted to bear on the dough, means for receiving the dough from the conveyer, said means consisting of a fixed element and a reciprocating element, the latter arranged at an angle to the fixed element and forming therewith a trough-shaped receptacle for the dough and said reciprocating element adapted to release the dough from the receptacle in the manner described, means for operating the conveyer and means for operating the reciprocating element.

2. In a dough-manipulating machine, a dough-conveyer, pressure means yieldingly mounted above the conveyer and adapted to bear on the dough, means for receiving the dough from the conveyer said means consisting of a fixed vertically-arranged element and a reciprocating element arranged at an acute angle to the fixed element and forming therewith a trough-shaped receptacle for the dough, means for operating said conveyer and means for operating the reciprocating element.

In testimony whereof I affix my signature in presence of two witnesses.

FRANK STREICH.

Witnesses:
M. A. MILORD,
F. BENJAMIN.